(12) United States Patent
Castinado et al.

(10) Patent No.: US 11,880,440 B2
(45) Date of Patent: Jan. 23, 2024

(54) SCHEME EVALUATION AUTHENTICATION SYSTEM

(71) Applicant: BANK OF AMERICA CORPORATION, Charlotte, NC (US)

(72) Inventors: Joseph Benjamin Castinado, North Glenn, CO (US); Naoll Addisu Merdassa, Chakopee, MN (US); Kevin Graham Robberts, Charlotte, NC (US); Ann Ta, Scottsdale, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 257 days.

(21) Appl. No.: 17/397,484

(22) Filed: Aug. 9, 2021

(65) Prior Publication Data

US 2023/0045301 A1 Feb. 9, 2023

(51) Int. Cl.
*G06F 21/31* (2013.01)
*G06F 40/279* (2020.01)

(52) U.S. Cl.
CPC .......... *G06F 21/316* (2013.01); *G06F 40/279* (2020.01)

(58) Field of Classification Search
CPC .............................. G06F 21/316; G06F 40/279

USPC .............................................. 726/4
See application file for complete search history.

(56) References Cited

U.S. PATENT DOCUMENTS

| | | | | |
|---|---|---|---|---|
| 2010/0299292 | A1* | 11/2010 | Collazo | G06F 21/577 706/14 |
| 2013/0198832 | A1* | 8/2013 | Draluk | G06F 21/316 726/16 |
| 2017/0103194 | A1* | 4/2017 | Wechsler | G06F 21/316 |
| 2017/0289168 | A1* | 10/2017 | Bar | H04L 63/102 |
| 2020/0293638 | A1* | 9/2020 | Rose | H04L 63/20 |

* cited by examiner

*Primary Examiner* — Jacob Lipman
(74) *Attorney, Agent, or Firm* — Moore & Van Allen PLLC; Nicholas C. Russell (57) ABSTRACT

Embodiments of the invention are directed to systems, methods, and computer program products for a scheme evaluation authentication system to evaluate user action and machine learned pattern recognition for misappropriation activity prevention. In this way, bot and token deployment is utilized for identification of user actions to generate a user idiosyncrasy database. Using the database, the system creates a real-time scheme evaluation authentication for user authentication upon user attempted authentications. As such, a user may by authenticate irrespective of user inputs, but instead based on a match of user actions at the authentication location in real-time compared to the idiosyncrasy database.

17 Claims, 6 Drawing Sheets

SCHEME EVALUATION AUTHENTICATION SYSTEM

BACKGROUND

When a user wishes to exchange data between multiple systems or applications, a set of authentication credentials such as a username, password, or multi-factor authentication code is typically required, especially in scenarios related to the exchange of sensitive data. Said authentication credentials may be difficult to remember and highly labor intensive for a user to provide. Additionally, they are highly susceptible to being compromised in a data breach. As such, a need exists for a system which eliminates the need for user involvement in the authentication process by utilizing system-to-system authentication credential exchange.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The invention utilizes machine learning to evaluate a user action and predict potential misappropriation activity. This may include password/pin confirmation and user action patterns from a location and spend historic spend. For example, the system may monitor typing gait for pins/passwords or may use natural language processing to identify new passwords that fall outside of a typical scheme. For another example, the system may factor in past spending patterns and location-based data to identify unusual activity.

Embodiments of the invention are directed to systems, methods, and computer program products for a scheme evaluation authentication system to evaluate user action and machine learned pattern recognition for misappropriation activity prevention. In this way, bot and token deployment is utilized for identification of user action. Machine learning is applied to the user actions identified and creates a real-time scheme evaluation authentication for user authentication upon update of user accounts and user activity.

Embodiments of the invention relate to systems, methods, and computer program products for scheme evaluation authenticating, the invention comprising: learning user actions on a user device and a third party device, wherein learning user actions comprises deploying one or more bots to a user device or a third party device to record user actions; generating user idiosyncrasy database with the learned user actions; identifying an authentication event initiation associated with the user; extracting user action idiosyncrasies associated with the authentication event; matching user action idiosyncrasies from the user idiosyncrasy database to user action idiosyncrasies associated with the authentication event; and allowing a continuum of authentication based on an amount of user action idiosyncrasies matched, wherein the authentication is irrespective of a failed login attempt at the authentication event initiation associated with the user.

In some embodiments, identifying an authentication event initiation associated with the user further comprises identifying a failed login, wherein an input of a password or pin was incorrect.

In some embodiments, the idiosyncrasy database extracts user action idiosyncrasies from user actions. In some embodiments, natural language processing is applied to the user action idiosyncrasies to identify on a continuum that new user actions correlate to the user. In some embodiments, the natural language processing is applied to the failed login attempt to determine if the failed login attempt password is a predicted password based on user historic passwords.

In some embodiments, user actions comprises user action idiosyncrasies, wherein user action idiosyncrasies include user typing gait, user touch screen gait, angle of viewing of the user devices, and user location when using the user device.

In some embodiments, the invention further comprises creating a feedback loop of matched user action idiosyncrasies from user action idiosyncrasies associated with the authentication event in real-time to the idiosyncrasy database.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be the merchant itself.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"User" as used herein may refer to an individual or individual associated with an entity. As such, in some embodiments, the user may be an individual having past relationships, current relationships or potential future relationships with an entity. In some instances, a "user" is an individual who has a relationship with the entity, such as a customer or a prospective customer. In some instances described herein, the user is an individual who seeks to utilize, operate, or perform one or more activities associated with a computer terminal, typically based on successful validation of the user's authentication credentials. In other embodiments, a user may be a system or an entity performing one or more tasks described herein. Accordingly, as used herein the term "user device" or "mobile device" may refer to mobile phones, personal computing devices, tablet computers, wearable devices, and/or any portable electronic device capable of receiving and/or storing data therein.

"User actions" as used herein includes user typing gait, typing speed, touch screen pressure, user touch screen gait, angle of viewing of user devices, historic passwords, historic pins, user location and activity at those locations with respect to resource distributions, and the like. "User activity" includes the user of the user action to perform a function, such as logging in, authenticating, performing a transaction, performing a resource transfer, or the like.

"Transaction" or "resource transfer" as used herein may refer to any communication between a user and a third party merchant or individual to transfer funds for purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

"Engine" as used herein may refer to core elements of a computer program, or part of a computer program that serves as a foundation for a larger piece of software and drives the functionality of the software. An engine may be self-contained, but externally controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

The system described herein provides a machine learning to evaluate a user action and predict potential misappropriation activity. This may include password/pin confirmation and user action patterns from a location and spend historic spend. For example, the system may monitor typing gait for pins/passwords or may use natural language processing to identify new passwords that fall outside of a typical scheme. For another example, the system may factor in past spending patterns and location-based data to identify unusual activity.

In this way, the system may communicate with the third party device and provide a universal token to the third party device that may match to any user action within the idiosyncrasy database. If there is a match between the user action at the third party device and the idiosyncrasy database, the user may be allowed access and/or authentication based on the action at the third party device. This authentication may be independent of the user providing a correct password or pin at the third party device. Instead, the system may recognized user actions at the third party device as being the same or similar to tokenized actions in the idiosyncrasy database. As such, the system allows the user authentication without a correct password or pin entrance.

For example, the system may identify the typing gait of the user at the third party device and, based on token deployment, authenticate the user at the third party device irrespective of the user inputting a correct password. The system may identify serval user actions at the third party device as matching user actions stored in the idiosyncrasy database. The combination of these actions may provide a confidence level that the user is the user and authenticate the user to the third party device without correct password or pin entrance. For example, the user may be attempting to input one or more historic passwords, have a matching typing gait as the idiosyncrasy database, be holding a mobile device at a same angle as the idiosyncrasy database, or the like.

Figure 1:
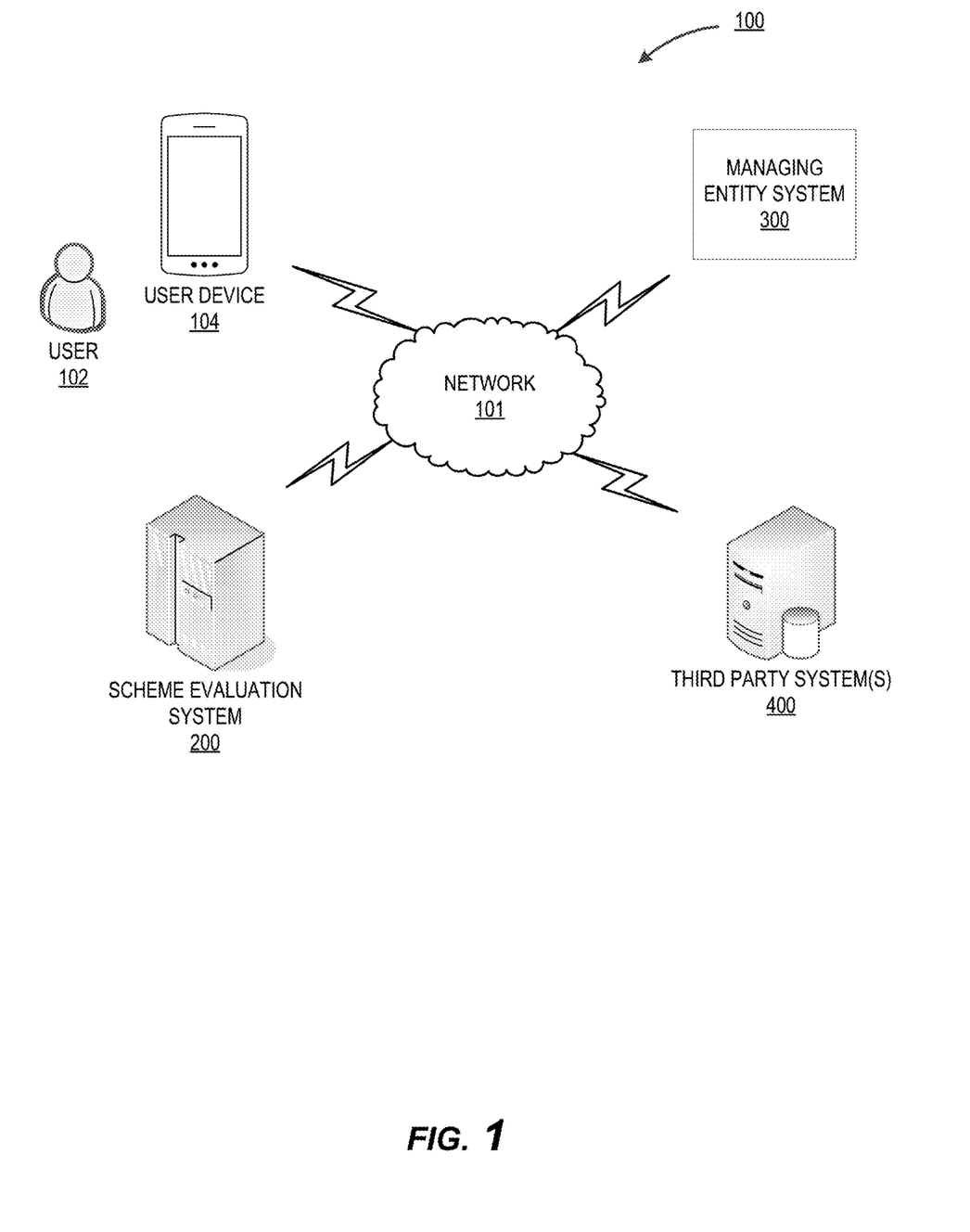
FIG. 1 illustrates a scheme evaluation authentication system environment, in accordance with one embodiment of the present disclosure.

FIG. 1 illustrates a scheme evaluation authentication operating environment 100, in accordance with one embodiment of the present disclosure. As illustrated, the system environment 100 may comprise a user device 104 in operative communication with one or more third party systems 400 via a network 101. The system environment also includes a user 102, a managing entity system 300, a scheme evaluation system 200, and/or other systems/devices not illustrated herein and connected via a network 101. As such, the user device 104 is configured such that the user 102 may access, log in to, and/or communicate with the third party system(s) 400 by establishing operative communication channels between the user device 104, the managing entity system 300, and the third party system(s) 400 via a wireless network.

Typically, the scheme evaluation system 200 is in operative communication with the managing entity system 400, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the third party system(s) 400). In this regard, the wireless communication channel may further comprise near field communication (NFC), communication via radio waves, communication through the internet, communication via electromagnetic waves and the like.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, laptop computers, cameras, video recorders, audio/video player, radio, GPS devices, any combination of the aforementioned, or the like. The user device is described in greater detail with respect to FIG. 3.

The managing entity system 300 may comprise a communication module and memory not illustrated and may be configured to establish operative communication channels with the third party system(s) 400 and a user device 104 via a network 101. The managing entity may comprise a user data repository which stores user account and/or user historical data. This data may be used by the managing entity to authenticate communications between the user device 104 and the third party system(s) 400. In some embodiments, the managing entity system is in operative communication with the scheme evaluation system 200 via a private communication channel. The private communication channel may be via a network 101 or the scheme evaluation system 200 may be fully integrated within the managing entity system 400.

Figure 2:
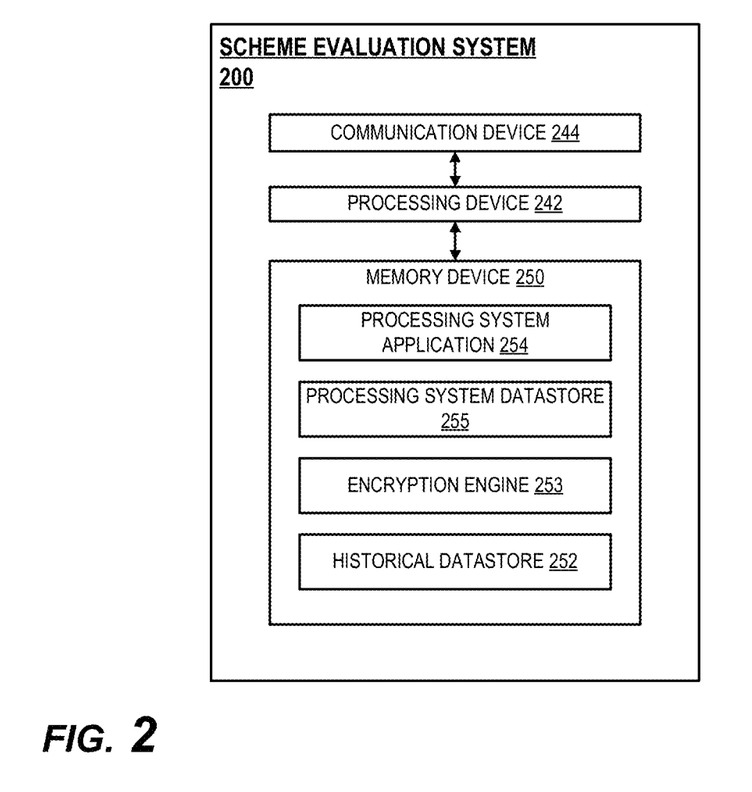
FIG. 2 is a block diagram illustrating the scheme evaluation system.

FIG. 2 illustrates a block diagram of the scheme evaluation system 200 associated with the operating environment 100, in accordance with embodiments of the present invention. As illustrated in FIG. 2, the scheme evaluation system 200 may include a communication device 244, a processing device 242, and a memory device 250 having a historical datastore 252, an encryption engine 253, a processing system application 254 and a processing system datastore 255 stored therein. As shown, the processing device 242 is operatively connected to and is configured to control and cause the communication device 244, and the memory device 250 to perform one or more functions described herein. In some embodiments, the encryption engine 253 and/or the processing system application 254 comprises computer readable instructions that when executed by the processing device 242 cause the processing device 242 to perform one or more functions and/or transmit control instructions to the managing entity system 300, the third party system(s) 400, and/or the communication device 244. It will be understood that the encryption engine 253 and/or the processing system application 254 may be executable to initiate, perform, complete, and/or facilitate one or more portions of any embodiments described and/or contemplated herein, and specifically embodiments directed to generation of encrypted authentication tokens. The encryption engine 253 may comprise executable instructions associated with generation and encryption of authentication tokens and may be embodied within the processing system application 254 in some instances. The scheme evaluation system 200 may be owned by, operated by and/or affiliated with the same managing entity that owns or operates the managing entity system 300. In some embodiments, the scheme evaluation system 200 is fully integrated within the managing entity system 300.

The communication device 244 may generally include a modem, server, transceiver, and/or other devices for communicating with other devices on the network 101. The network communication device 244 may be a communication interface having one or more communication devices configured to communicate with one or more other devices on the network 101, such as the scheme evaluation system 200, the user device 104, other processing systems, data systems, and the like.

Additionally, referring to the scheme evaluation system 200 illustrated in FIG. 2, the processing device 242 may generally refer to a device or combination of devices having circuitry used for implementing the communication and/or logic functions of the scheme evaluation system 200. For example, the processing device 242 may include a control unit, a digital signal processor device, a microprocessor device, and various analog-to-digital converters, digital-to-analog converters, and other support circuits and/or combinations of the foregoing. Control and signal processing functions of the system 200 may be allocated between these processing devices according to their respective capabilities. The processing device 242 may further include functionality to operate one or more software programs based on computer-executable program code thereof, which may be stored in a memory device 250, such as the processing system application 254 and the encryption engine 253. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 242 may be configured to use the network communication interface of the communication device 244 to transmit and/or receive data and/or commands to and/or from the other devices/systems connected to the network 101.

The memory device 250 within the scheme evaluation system 200 may generally refer to a device or combination of devices that store one or more forms of computer-readable media for storing data and/or computer-executable program code/instructions. For example, the memory device 250 may include any computer memory that provides an actual or virtual space to temporarily or permanently store data and/or commands provided to the processing device 242 when it carries out its functions described herein.

Figure 3:
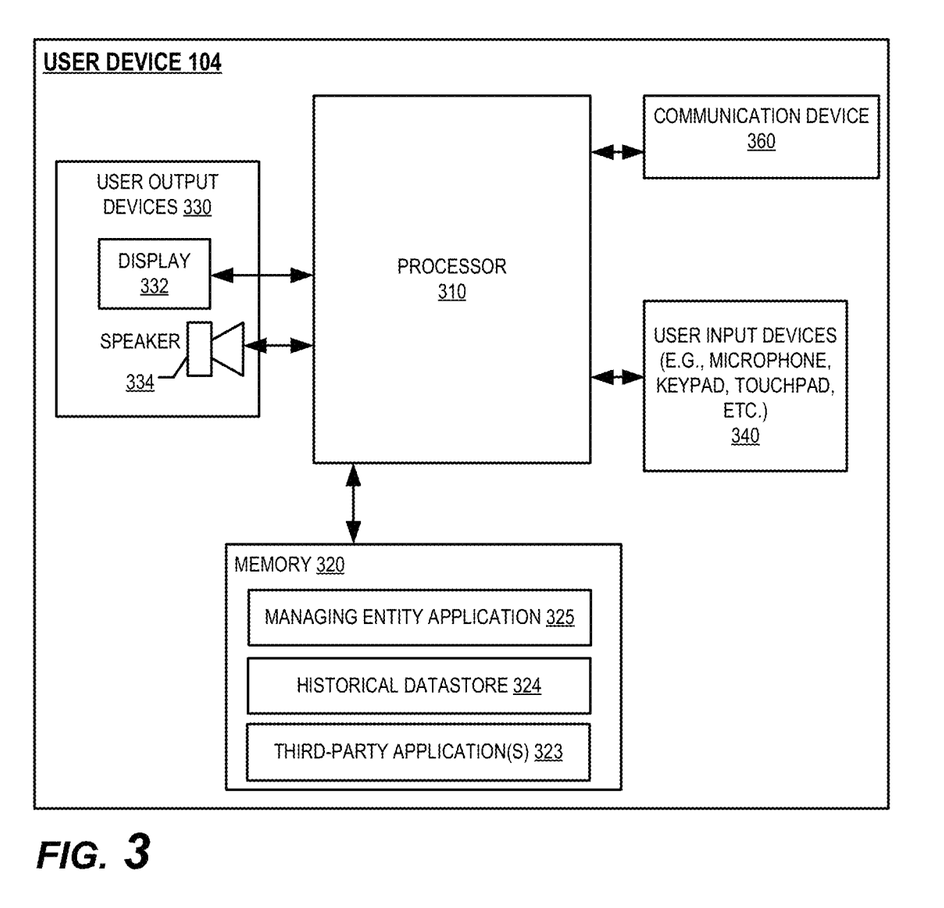
FIG. 3 is a block diagram illustrating a user device associated with the system environment.

FIG. 3 illustrates a block diagram of the user device associated with the token generation operating environment 100, in accordance with embodiments of the present invention. The user device 104 may include a user mobile device or the like. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, laptop computers, cameras, video recorders, audio/video player, radio, GPS devices, any combination of the aforementioned devices.

The mobile device 104 may generally include a processing device or processor 310 communicably coupled to devices such as, a memory device 320, user output devices 330 (for example, a user display device 332, or a speaker 334), user input devices 340 (such as a microphone, keypad, touchpad, touch screen, fingerprint scanner, camera, and/or the like), a communication device or network interface device 360, one or more chips, and the like.

The processor 310 may include functionality to operate one or more software programs or applications, which may be stored in the memory device 320. For example, the processor 310 may be capable of operating applications such as the managing entity application 325, one or more third party applications 323, a historical datastore 324, or a web browser application. The managing entity application 325 may then allow the mobile device 104 to transmit and receive data and instructions to or from the managing entity system 300 (for example, via wireless communication or NFC channels), data and instructions to or from the processing system 200, web content, such as, for example, location-based content and/or other web page content, according to a Wireless Application Protocol (WAP), Hypertext Transfer Protocol (HTTP), and/or the like.

The processor 310 may be configured to use the communication device 360 to communicate with one or more other devices on a network 101 such as, but not limited to the managing entity system 300 and the scheme evaluation system 200. The processor 310 may be configured to provide signals to and receive signals from the communication device 360. The signals may include signaling information in accordance with the air interface standard of the applicable BLE standard, cellular system of the wireless telephone network and the like, that may be part of the network 101. In this regard, the mobile device 104 may be configured to operate with one or more air interface standards, communication protocols, modulation types, and access types. By way of illustration, the mobile device 104 may be configured to operate in accordance with any of a number of first, second, third, and/or fourth-generation communication protocols and/or the like. For example, the mobile device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 104 may also be configured to operate in accordance with non-cellular communication mechanisms, such as via a wireless local area network (WLAN) or other communication/data networks. The mobile device 104 may also be configured to operate in accordance Bluetooth® low energy, audio frequency, ultrasound frequency, or other communication/data networks.

The communication device 360 may also include a user activity interface presented in user output devices 330 in order to allow a user 102 to execute some or all of processes described herein. Furthermore, the application interface may have the ability to connect to and communicate with an external data storage on a separate system within the network 101. As described above, the mobile device 104 includes a user interface that includes user output devices 330 and/or user input devices 340. The user output devices 330 may include a display 332 (e.g., a liquid crystal display (LCD) or the like) and a speaker 334 or other audio device, which are operatively coupled to the processor 310. The user input devices 340, which may allow the mobile device 104 to receive data from the user 102, may include any of a number of devices allowing the mobile device 104 to receive data from a user 102, such as a keypad, keyboard, touch-screen, touchpad, microphone, mouse, joystick, other pointer device, button, soft key, and/or other input device(s).

The mobile device 104 may also include a memory buffer, cache memory or temporary memory device operatively coupled to the processor 310. Typically, one or more applications 325, 324, and 323, are loaded into the temporary memory during use. As used herein, memory may include any computer readable medium configured to store data, code, or other information. The memory device 320 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the scheme evaluation system 200 performing one or more steps described herein in conjunction with other devices and systems, either automatically based on executing computer readable instructions of the memory device 250, or in response to receiving control instructions from the managing entity system 300. In some instances, the system refers to the devices and systems on the operating environment 100 of FIG. 1. The features and functions of various embodiments of the invention are be described below in further detail.

It is understood that the servers, systems, and devices described herein illustrate one embodiment of the invention. It is further understood that one or more of the servers, systems, and devices can be combined in other embodiments and still function in the same or similar way as the embodiments described herein.

Embodiments of the invention are directed to systems, methods, and computer program products for a scheme evaluation authentication system to evaluate user action and machine learned pattern recognition for misappropriation activity prevention. In this way, bot and token deployment is utilized for identification of user action. Machine learning is applied to the user actions identified and creates a real-time scheme evaluation authentication for user authentication upon update of user accounts and user activity. The system utilizes machine learning or an algorithm to evaluate user actions and predict potential misappropriation activity. For example, the system may monitor typing gait for pins/passwords and may use natural language processing to identify new passwords that fall outside of a typical scheme. The system may also factor in past spending patterns and location-based data to identify unusual activity.

Figure 4:
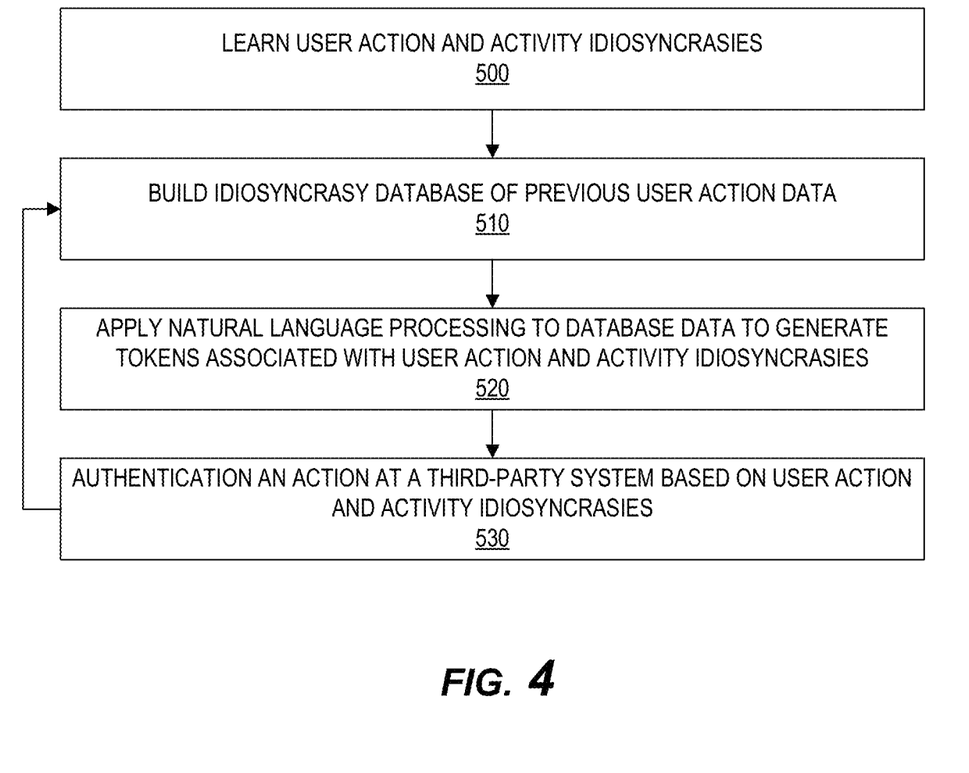
FIG. 4 is a flow diagram illustrating a process onboarding and using the scheme evaluation authentication system, in accordance with one embodiment of the present disclosure.

FIG. 4 is a high-level process flow diagram illustrating a process using the scheme evaluation system 200, in accordance with one embodiment of the present disclosure. As illustrated in block 500, the process is initiated by learning user action and activity idiosyncrasies. In this way, the system may reach out to third party devices and user devices to identify user actions and activity. The user actions, as used herein includes user typing gait, user touch screen gait, angle of viewing of user devices, historic passwords, historic pins, user location and activity at those locations with respect to resource distributions, and the like. The system may identify these user actions based on, in some embodiments, a bot deployment to user devices and third party devices. The bots are deployed and identify when a user action occurs and transmits the user action to the system. In other embodiments, the user may allow for or authorize for system identification of user actions and activities. The system may compile these user actions and activities and build an idiosyncrasies database of the user's activities. This may include typical user typing gaits, user touch screen gaits, user touch screen interactions, angle of viewing of user devices, historic passwords, historic pins, user location and activity at those locations with respect to resource distributions, and the like.

As illustrated in block 510, the process continues by building the idiosyncrasy database of previous user actions and activity data. The database is continually updated with real-time data of authorized user actions in order to continually provide real-time user action data for the scheme evaluation authentication system. As illustrated, if a user is authenticated or not, the system provides a feedback loop to the database in order to continually update and maintain the database in real-time.

As illustrated in block 520, the process continues by applying rotational algorithm to the user actions and activity data within the idiosyncrasy database to generate tokens associated with user actions and activity idiosyncrasies. In this way, once a user action idiosyncrasy is identified, the system may generate an authentication token associated with that action. The system may further use machine learning and natural language processing to identify new passwords, new user actions, and new resource distributions that could be performed by the user based on machine learning trends identified by the system from user historic action data from the idiosyncrasy database.

Next, as illustrated in block 530, the process continues by authenticating an action at a third party device based on user action and activity idiosyncrasies. In this way, the system may communicate with the third party device and provide a universal token to the third party device that may match to any user action within the idiosyncrasy database. If there is a match between the user action at the third party device and the idiosyncrasy database, the user may be allowed access and/or authentication based on the action at the third party device. This authentication may be independent of the user providing a correct password or pin at the third party device. Instead, the system may recognized user actions at the third party device as being the same or similar to tokenized actions in the idiosyncrasy database. As such, the system allows the user authentication without a correct password or pin entrance.

For example, the system may identify the typing gait of the user at the third party device and, based on token deployment, authenticate the user at the third party device irrespective of the user inputting a correct password. The system may identify serval user actions at the third party device as matching user actions stored in the idiosyncrasy database. The combination of these actions may provide a confidence level that the user is the user and authenticate the user to the third party device without correct password or pin entrance. For example, the user may be attempting to input one or more historic passwords, have a matching typing gait as the idiosyncrasy database, be holding a mobile device at a same angle as the idiosyncrasy database, or the like.

Figure 5:
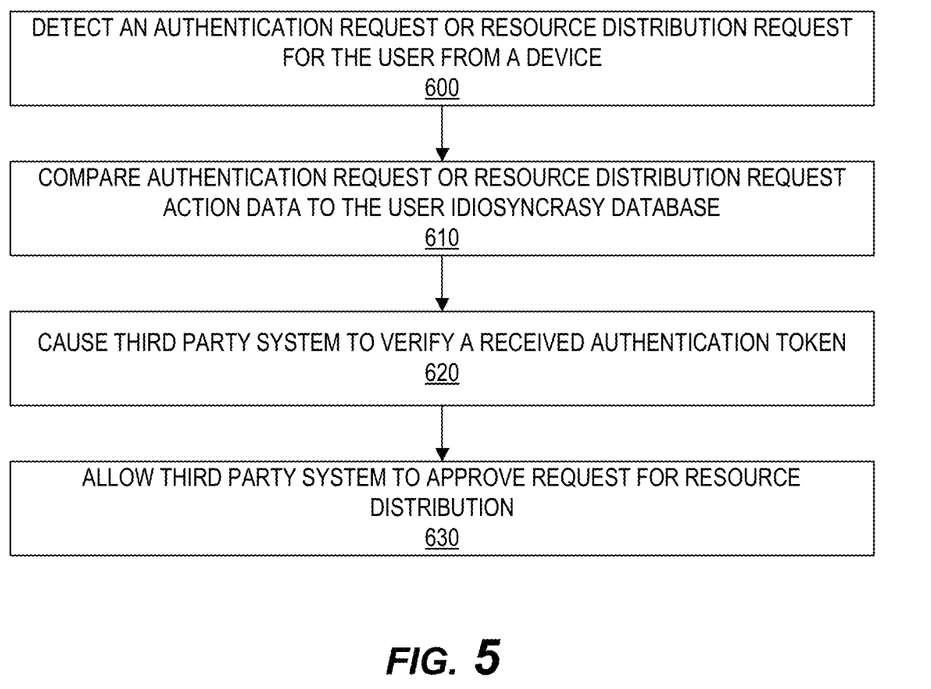
FIG. 5 is a flow diagram illustrating a process using the scheme evaluation authentication, in accordance with another embodiment of the present disclosure.

FIG. 5 is a high-level process flow diagram illustrating a process using the scheme evaluation system, in accordance with another embodiment of the present disclosure. As illustrated in block 600, the process is initiated by detecting an authentication request or a resource distribution request for the user from a device. The device may be a user device or a third party device. The authentication request may be a request to gain access to one or more locations (either digitally or physically) that require the user to authenticate to gain access. This may include inputting of a password and/or pin. A resource distribution request may be an authorization request for transferring resources, such as the transfer of currency, from the user to another entity or individual. The system may detect the authentication request based on bot deployment at the device associated with the request, a communication from the device associated with the request, third party communication, or user communication.

Once the authentication request or resource distribution request is detected and transmitted to the system, the system may extract action data associated with the authentication request or resource distribution request. The action data from the authentication request or resource distribution request is compared to the user's idiosyncrasy database, as illustrated in block 610. If the user actions at the device receiving the request match one or more user idiosyncrasies identified on the user idiosyncrasy database, the system may generate a token that allows completion of the authentication request or resource distribution request independent of any user input of a password or pin. In some embodiments, the number of datapoints matched between the user actions and the idiosyncrasy database may allow the system to create an authentication continuum which allows user access to some, but not all data requests. In some embodiments, it allows a user to distribution up to an amount of resources and not over a threshold of resources.

As illustrated in block 630, a token may be transmitted to the third party system associated with the request based on a match of the user actions in real-time to the idiosyncrasy database to allow an approval of the authentication or resource distribution, a denial of the authentication or resource distribution, or a continuum middle authentication or resource distribution. This authentication or resource distribution may be independent of any user input of a password or pin associated with the request.

In some embodiments, the request is not transmitted to the system, but instead the system transmits a token to the device associated with the request for matching the user to data on the user idiosyncrasy database.

In some embodiments, the token may be transmitted to the third party system associated with the request based on a match of the user actions in real-time to the idiosyncrasy database to allow an approval of the authentication or resource distribution, a denial of the authentication or resource distribution, or a continuum middle authentication or resource distribution. This authentication or resource distribution may be independent of any user input of a password or pin associated with the request.

Figure 6A:
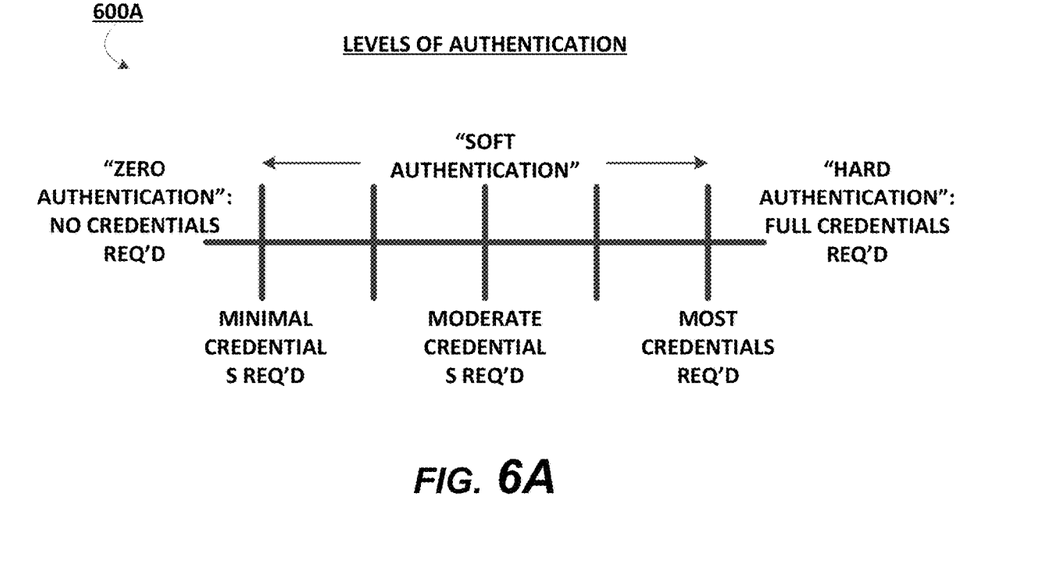
FIG. 6a is a flow diagram illustrating a process using the scheme evaluation authentication continuum, in accordance with another embodiment of the present disclosure.

Referring to FIG. 6A, illustrating process using the scheme evaluation authentication continuum 600A, is illustrated according to embodiments of the invention. On the left-hand side of the continuum, a "zero authentication"/lowest level of authentication requires no authentication credentials and no match of the idiosyncrasy database. On the right-hand side of the continuum, a "hard authentication"/highest level of authentication requires full authentication credentials and a complete match of the user actions in real-time to the idiosyncrasy database. This means that it requires the strictest combination of credentials. In between the two extremes, "a soft authentication" requires minimal credentials, moderate credentials or most credentials for various points along the continuum and will correlate to the number of matches between the user action and the data on the idiosyncrasy database. The continuum generally represents the number of credentials required and/or the relative strength of the credentials required for that point on the continuum.

Figure 6B:
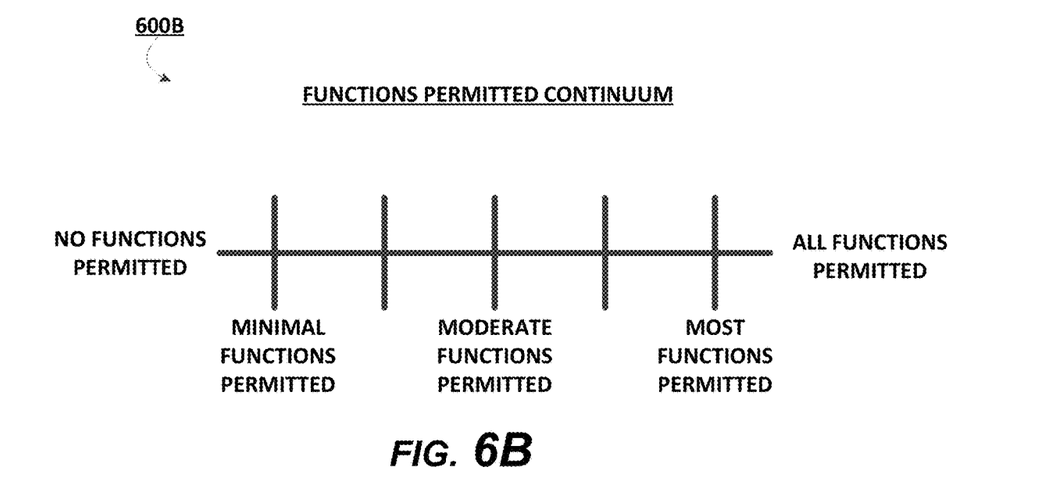
FIG. 6b is a flow diagram illustrating a process using the scheme evaluation authentication to functionality continuum, in accordance with another embodiment of the present disclosure.

Referring to FIG. 6B, the functions permitted continuum 600B illustrates various levels of functions (e.g., electronic activities) permitted. Functions may refer to what a user is permitted to "see" and/or what the user is permitted to "do". More specifically, this may refer to whether a specific function is permitted at a certain point on the continuum and/or the context in which a certain function is permitted based on a match between the user action and the idiosyncrasy database. The left-hand side of the continuum indicates that no functions are permitted, and the right-hand side of the continuum indicates that all functions are permitted and require complete matching between the user action and the idiosyncrasy database. In between the extremes, minimal functions are permitted, moderate functions are permitted and most functions are permitted. Thus, any given point along the continuum 400B corresponds with a certain amount and/or number of functions that are permitted and/or the context in which certain functions are permitted.

Embodiments of the invention are directed to systems, methods, and computer program products for a scheme evaluation authentication system to evaluate user action and machine learned pattern recognition for misappropriation activity prevention. In this way, bot and token deployment is utilized for identification of user actions to generate a user idiosyncrasy database. Using the database, the system creates a real-time scheme evaluation authentication for user authentication upon user attempted authentications. As such, a user may by authenticate irrespective of user inputs, but instead based on a match of user actions at the authentication location in real-time compared to the idiosyncrasy database.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for scheme evaluation authenticating, the system comprising:
   a memory device with computer-readable program code stored thereon;
   a communication device;
   a processing device operatively coupled to the memory device and the communication device, wherein the processing device is configured to execute the computer-readable program code to:
   learn user actions on a user device and a third party device, wherein learning user actions comprises deploying one or more bots to a user device or a third party device to record user actions;
   generate user idiosyncrasy database with the learned user actions, wherein the idiosyncrasy database extracts user action idiosyncrasies from user actions;
   identify an authentication event initiation associated with the user, wherein the authentication event includes a failed login;
   extract user action idiosyncrasies associated with the authentication event;
   apply natural language processing is to the failed login attempt to determine if the failed login attempt password is a predicted password based on user historic passwords;
   match user action idiosyncrasies from the user idiosyncrasy database to user action idiosyncrasies associated with the authentication event; and
   allow a continuum of authentication based on an amount of user action idiosyncrasies matched, wherein the authentication is irrespective of the failed login attempt at the authentication event initiation associated with the user.

2. The system of claim 1, wherein identifying an authentication event initiation associated with the user further comprises identifying the failed login, wherein an input of a password or pin was incorrect.

3. The system of claim 1, wherein the natural language processing is applied to the user action idiosyncrasies to identify on a continuum that new user actions correlate to the user.

4. The system of claim 1, wherein user actions comprises user action idiosyncrasies, wherein user action idiosyncrasies include user typing gait and user touch screen gait.

5. The system of claim 1, further comprising creating a feedback loop of matched user action idiosyncrasies from user action idiosyncrasies associated with the authentication event in real-time to the idiosyncrasy database.

6. The system of claim 1, wherein user actions comprises an angle of viewing of the user devices and user location when using the user device.

7. A computer program product for scheme evaluation authenticating with at least one non-transitory computer-readable medium having computer-readable program code portions embodied therein, the computer-readable program code portions comprising:
   an executable portion configured for learning user actions on a user device and a third party device, wherein learning user actions comprises deploying one or more bots to a user device or a third party device to record user actions;
   an executable portion configured for generating user idiosyncrasy database with the learned user actions, wherein the idiosyncrasy database extracts user action idiosyncrasies from user actions;
   an executable portion configured for identifying an authentication event initiation associated with the user, wherein the authentication event includes a failed login;
   an executable portion configured for extracting user action idiosyncrasies associated with the authentication event;
   an executable portion configured for applying natural language processing is to the failed login attempt to determine if the failed login attempt password is a predicted password based on user historic passwords;
   an executable portion configured for matching user action idiosyncrasies from the user idiosyncrasy database to user action idiosyncrasies associated with the authentication event; and
   an executable portion configured for allowing a continuum of authentication based on an amount of user action idiosyncrasies matched, wherein the authentication is irrespective of the failed login attempt at the authentication event initiation associated with the user.

8. The computer program product of claim 7, wherein identifying an authentication event initiation associated with the user further comprises identifying the failed login, wherein an input of a password or pin was incorrect.

9. The computer program product of claim 7, wherein the natural language processing is applied to the user action idiosyncrasies to identify on a continuum that new user actions correlate to the user.

10. The computer program product of claim 7, wherein user actions comprises user action idiosyncrasies, wherein user action idiosyncrasies include user typing gait and user touch screen gait.

11. The computer program product of claim 7, further comprising an executable portion configured for creating a feedback loop of matched user action idiosyncrasies from user action idiosyncrasies associated with the authentication event in real-time to the idiosyncrasy database.

12. The computer program product of claim 7, wherein user actions comprises an angle of viewing of the user devices and user location when using the user device.

13. A computer-implemented method for scheme evaluation authenticating, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
learning user actions on a user device and a third party device, wherein learning user actions comprises deploying one or more bots to a user device or a third party device to record user actions;
generating user idiosyncrasy database with the learned user actions, wherein the idiosyncrasy database extracts user action idiosyncrasies from user actions;
identifying an authentication event initiation associated with the user, wherein the authentication event includes a failed login;
extracting user action idiosyncrasies associated with the authentication event;
applying natural language processing is to the failed login attempt to determine if the failed login attempt password is a predicted password based on user historic passwords;
matching user action idiosyncrasies from the user idiosyncrasy database to user action idiosyncrasies associated with the authentication event; and
allowing a continuum of authentication based on an amount of user action idiosyncrasies matched, wherein the authentication is irrespective of the failed login attempt at the authentication event initiation associated with the user.

14. The computer-implemented method of claim 13, wherein identifying an authentication event initiation associated with the user further comprises identifying the failed login, wherein an input of a password or pin was incorrect.

15. The computer-implemented method of claim 13, wherein the natural language processing is applied to the user action idiosyncrasies to identify on a continuum that new user actions correlate to the user.

16. The computer-implemented method of claim 13, wherein user actions comprises user action idiosyncrasies, wherein user action idiosyncrasies include user typing gait and user touch screen gait.

17. The computer-implemented method of claim 13, wherein user actions comprises an angle of viewing of the user devices and user location when using the user device.

* * * * *